(12) United States Patent
Okazaki

(10) Patent No.: US 11,197,471 B2
(45) Date of Patent: Dec. 14, 2021

(54) IMAGE FORMING APPARATUS

(71) Applicant: KYOCERA Document Solutions Inc., Osaka (JP)

(72) Inventor: Yusuke Okazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 229 days.

(21) Appl. No.: 16/474,469

(22) PCT Filed: Dec. 22, 2017

(86) PCT No.: PCT/JP2017/046144
§ 371 (c)(1),
(2) Date: Jun. 27, 2019

(87) PCT Pub. No.: WO2018/123870
PCT Pub. Date: Jul. 5, 2018

(65) Prior Publication Data
US 2019/0343106 A1    Nov. 14, 2019

(30) Foreign Application Priority Data
Dec. 28, 2016 (JP) .............................. JP2016-255231

(51) Int. Cl.
*B41J 2/01* (2006.01)
*A01M 1/02* (2006.01)

(52) U.S. Cl.
CPC . *A01M 1/02* (2013.01); *B41J 2/01* (2013.01)

(58) Field of Classification Search
CPC .......... A01M 1/02; B41J 2/01; B41J 2/16538; B41J 2/16508; B41J 2/16585; B41J 11/0015; G03G 2215/00801; G03G 15/6585
See application file for complete search history.

(56) References Cited

U.S. PATENT DOCUMENTS 9,639,012 B1 * 5/2017 Yoshida ............... G03G 9/0935
9,803,159 B2 * 10/2017 Ohara ...................... C11B 7/00

FOREIGN PATENT DOCUMENTS

| CN | 105690994 A | 6/2016 |
| JP | H11-320467 A | 11/1999 |
| JP | 2000-272195 A | 10/2000 |
| JP | 2001-030541 A | 2/2001 |
| JP | 2010-208100 A | 9/2010 |

OTHER PUBLICATIONS

Machine translation of JP 2000-272195, published on Oct. 2000.*
An Office Action mailed by China National Intellectual Property Administration dated Apr. 13, 2020, which corresponds to Chinese Patent Application No. 201780080966.2 is related to U.S. Appl. No. 16/474,469 with English language translation.

* cited by examiner

*Primary Examiner* — Huan H Tran
(74) *Attorney, Agent, or Firm* — Studebaker & Brackett PC

(57) ABSTRACT

An image forming apparatus (1) includes a recording head section (4), a spray section (10), and a controller (9). The recording head section (4) forms an image on a paper sheet (S). The spray section (10) sprays a drug toward the paper sheet (S) to form a drug region (R) on the paper sheet (S). The controller (9) controls the spray section (10). The controller (9) controls the spray section (10) such that at least a part of the image formed on the paper sheet (S) and at least a part of the drug region (R) overlap each other.

8 Claims, 5 Drawing Sheets

IMAGE FORMING APPARATUS

TECHNICAL FIELD

The present invention relates to an image forming apparatus.

BACKGROUND ART

A remote-controllable working robot described in Patent Literature 1 includes an electric self-propelled vehicle body and a working robot. The electric self-propelled vehicle body and the working robot are remote-controllable. The working robot is supported by the electric self-propelled vehicle body. The working robot includes jetting means that jets a drug such as an insecticide. The drug acts on, for example, the olfactory organs of pest insects to attract the pest insects. The remote-controllable working robot described in Patent Literature 1 is moved by the electric self-propelled vehicle body and jets the drug. As a result, a drug region of such a sprayed drug is formed in, for example, a predetermined area of a floor surface or a predetermined area of a wall surface, and the pest insects are attracted to the drug region.

CITATION LIST

Patent Literature

[Patent Literature 1]
Japanese Patent Application Laid-Open Publication No. H11-320467

SUMMARY OF INVENTION

Technical Problem

However, the working robot described in Patent Literature 1 generally forms a drug region in a solid-color floor surface or a solid-color wall surface. Such a drug region cannot act on, for example, the visual organs of pest insects to attract the pest insects. This makes it difficult to attract many types of pest insects to the drug region.

The present invention made in light of the above-described problem has an object of providing an image forming apparatus capable of forming a recording medium that may act on the olfactory organs of pest insects and the visual organs of pest insects to attract many types of pest insects.

Solution to Problem

An image forming apparatus according to the present invention includes an image forming section, a spray section, and a controller. The image forming section forms an image on a recording medium. The spray section sprays a drug toward the recording medium to form a drug region on the recording medium. The controller controls the spray section. The controller controls the spray section such that at least a part of the image formed on the recording medium and at least a part of the drug region overlap each other.

Advantageous Effects of Invention

According to the present invention, a recording medium that may act on the olfactory organs of pest insects and the visual organs of pest insects to attract many types of pest insects can be formed.

DESCRIPTION OF EMBODIMENTS

Figure 1:
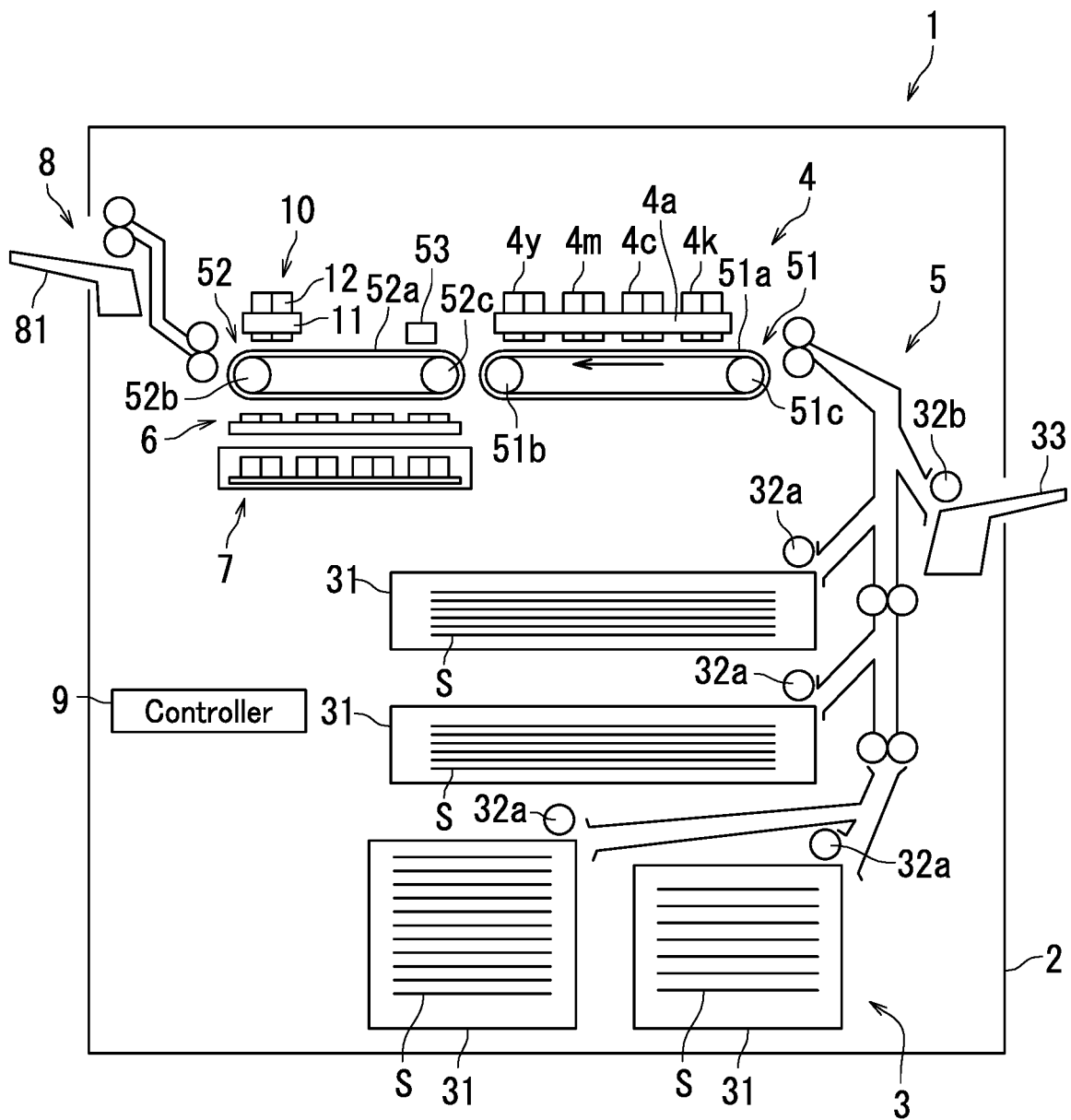
FIG. 1 illustrates a configuration of an image forming apparatus according to a first embodiment of the present invention.

Hereinafter, embodiments of an image forming apparatus 1 according to the present invention will be described with reference to the drawings. In the drawings, the same or corresponding elements will bear the same reference signs and the same description will not be repeated. The drawings mainly illustrate the elements schematically for easier understanding.

First Embodiment

With reference to FIG. 1, the image forming apparatus 1 according to a first embodiment of the present invention will be described. FIG. 1 illustrates a configuration of the image forming apparatus 1 according to the first embodiment of the present invention.

As illustrated in FIG. 1, the image forming apparatus 1 according to the first embodiment is a printer. The image forming apparatus 1 may be a copier, a facsimile machine, or a multifunction peripheral. The multifunction peripheral has at least two functions among, for example, a copying function, a printer function, and a facsimile function. The image forming apparatus 1 according to the first embodiment is of an inkjet system, by which an image is formed on a paper sheet S with ink. The image forming apparatus 1 may be of an electrophotographic system, by which a toner image is formed on the paper sheet S.

The image forming apparatus 1 includes a housing 2, a paper feed section 3, a recording head section 4, a conveyance section 5, a cap unit 6, a wiper section 7, an exit section 8, a controller 9, a spray section 10, and a drying device 53. The housing 2 accommodates the paper feed section 3, the recording head section 4, the conveyance section 5, the cap unit 6, the wiper section 7, the exit section 8, the controller 9, and the spray section 10.

The paper feed section 3 includes paper feed cassettes 31, paper feed rollers 32a and 32b, and a manual feed tray 33. The paper feed cassettes 31 are located in a bottom portion of the housing 2. The paper feed cassettes 31 are detachably attached to the housing 2. The paper feed cassettes 31 may each accommodate a plurality of paper sheets S in a stacked manner. The manual feed tray 33 is partially exposed outside from the housing 2. On the manual feed tray 33, a plurality of paper sheets S may be loaded in a stacked manner.

Such a paper sheet S is an example of a recording medium according to the present invention. The paper sheet S is, for example, plain paper, copy paper, recycled paper, thin paper, cardboard, glossy paper, or overhead projector (OHP) paper.

The paper feed rollers 32a each pick up the paper sheets S accommodated in the corresponding paper feed cassette 31 from the topmost paper sheet S one by one. The paper feed roller 32b picks up the paper sheets S loaded on the manual feed tray 33 from the topmost paper sheet S one by one. The paper feed rollers 32a and 32 each send the picked-up paper sheets S to the conveyance section 5.

The conveyance section 5 conveys the paper sheet S along a predetermined conveyance path. The conveyance path extends from the paper feed section 3 to the exit section 8 via the recording head section 4 and the spray section 10. The conveyance section 5 includes a first conveyance unit 51, a second conveyance unit 52, and a plurality of pairs of rollers. The plurality of pairs of rollers are located along the conveyance path.

The first conveyance unit 51 includes a conveyance belt 51a, a drive roller 51b, and a driven roller 51c. The conveyance belt 51a is wound along the drive roller 51b and the driven roller 51c. The paper sheet S conveyed onto the conveyance belt 51a is sent to the second conveyance unit 52 by circulation of the conveyance belt 51a.

The second conveyance unit 52 is located downstream in the conveyance path with respect to the first conveyance unit 51. The second conveyance unit 52 includes a conveyance belt 52a, a drive roller 52b, and a driven roller 52c. The conveyance belt 52a is wound along the drive roller 52b and the driven roller 52c. The paper sheet S conveyed onto the conveyance belt 52a is sent to the exit section 8 by circulation of the conveyance belt 52a.

The recording head section 4 is an example of an image forming section according to the present invention. The recording head section 4 is located above the first conveyance unit 51. The recording head section 4 is located opposite to the first conveyance unit 51. The recording head section 4 forms an image on the paper sheet S that is being conveyed by the first conveyance unit 51 with ink.

The recording head section 4 includes a head housing section 4a and recording heads 4y, 4m, 4c, and 4k. The recording heads 4y, 4m, 4c, and 4k are held on the head housing 4a. The recording head 4y ejects yellow ink. The recording head 4m ejects magenta ink. The recording head 4c ejects cyan ink. The recording head 4k ejects black ink. In this embodiment, the recording heads 4y, 4m, 4c, and 4k are each a line head. The recording heads 4y, 4m, 4c, and 4k may each be, for example, a serial head.

The drying device 53 is located, for example, above the second conveyance unit 52. The drying device 53 is located opposite to an upstream end of the second conveyance unit 52. The drying device 53 dries the image formed on the paper sheet S with ink.

The wiper section 7 is located below the second conveyance unit 52. The wiper section 7 includes a plurality of wiper blades. The plurality of wiper blades are each moved by a predetermined moving mechanism to perform wiping of the ink attached to the corresponding one of the recording heads 4y, 4m, 4c, or 4k.

The cap unit 6 is located below the second conveyance unit 52 and above the wiper section 7. The cap unit 6 includes a plurality of caps. The plurality of caps are each moved by a predetermined moving mechanism to adhere to the corresponding head 4y, 4m, 4c, or 4k. As a result, the ink in the recording heads 4y, 4m, 4c, and 4k are inhibited from drying.

The spray section 10 is located above the second conveyance unit 52. The spray section 10 is located opposite to the second conveyance unit 52. The spray section 10 sprays a drug toward the paper sheet S that is being conveyed by the second conveyance unit 52 to form a drug region on the paper sheet S. The spray section 10 may be located on the conveyance path between, for example, the paper feed section 3 and the recording head section 4 so as to be opposite to the paper sheet S that is being conveyed by the conveyance section 5.

The spray section 10 includes a head housing 11 and a spray head 12. The spray head 12 is held by the head housing 11. The spray head 12 sprays the drug toward the paper sheet S. As a result, the drug is attached to the paper sheet S to form the drug region on the paper sheet S. The drug is, for example, liquid, and is used to kill pest insects. The drug contains an attractant. The attractant may attract the pest insects to the drug region of the paper sheet S. The drug may further contain an insecticide component. The insecticide component may kill the pest insects attracted to the drug region of the paper sheet S. In this embodiment, the spray head 12 is a line head. The spray head 12 may be, for example, a serial head.

The exit section 8 includes an exit tray 81. The exit tray 81 is partially exposed outside from the housing 2. The paper sheet S having the image and the drug region formed thereon is ejected onto the exit tray 81. On the exit tray 81, the paper sheets S are stacked sequentially.

The controller 9 controls operation of the image forming apparatus 1. In more detail, the controller 9 includes a central processing unit (CPU) and memory. The memory stores therein various computer programs to be executed by the CPU. The CPU executes such various computer programs stored on the memory to control the paper feed section 3, the recording head section 4, the conveyance section 5, the cap unit 6, the wiper section 7, and the spray section 10.

Now, an image forming process and a drug spray process executed by the controller 9 will be described. The controller 9 executes the image forming process and the drug spray process based on input data. The input data is input from, for example, an input section external to the image forming apparatus 1, such as a personal computer.

The input data includes image data and drug data. The image data represents an image to be formed on the paper sheet S. The image data may be input from, for example, an image reading device such as a scanner. The drug data represents a drug region to be formed on the paper sheet S. The drug data may be input from, for example, a predetermined input device such as a touch panel included in the image forming apparatus 1. The drug data includes, for example, position information and concentration information. The position information represents the position of the drug region. The concentration information represents a concentration of the drug to be sprayed to form the drug region.

When the input data and a signal to start the processes are input, the controller 9 executes the image forming process and the drug spray process. The controller 9 executes the image forming process on the paper sheet S that is being conveyed by the first conveyance unit 51. In the image forming process, the controller 9 controls the recording head section 4 to form an image on the paper sheet S based on the image data. As a result, the image is formed on the paper sheet S that is being conveyed by the first conveyance unit 51.

In the image forming process, the controller 9 controls the drying device 53 while the paper sheet S having the image formed thereon is conveyed by the second conveyance unit 52. As a result, the image formed on the paper sheet S with ink is dried.

In the case where the input data includes the drug data, the controller 9 executes the drug spray process on the paper sheet S having the image formed thereon. In this embodiment, after the image formed on the paper sheet S is dried, the controller 9 executes the drug spray process on the paper sheet S that is being conveyed by the second conveyance unit 52. That is, the controller 9 controls the spray section 19 to spray the drug toward the recording medium after the drying device 53 dries the image. Therefore, such an inconvenience that the image formed on the paper sheet S bleeds by the drug sprayed toward the paper sheet S is prevented. In the case where the image forming apparatus 1 is of an electrophotographic system, the controller 9 executes the drug spray process on the paper sheet S after, for example, the toner image is fixed.

In the drug spray process, the controller 9 controls the spray section 10 based on the drug data. As a result, the drug is sprayed toward the paper sheet S, and the drug region is formed to overlap the image formed on the paper sheet S. For forming the drug region, the controller 9 controls the spray section 10 such that the concentration of the drug differs part by part in the drug region based on the drug data. In this embodiment, the drug is applied repeatedly on the paper sheet S, so that a portion having a high concentration of the drug is formed in the drug region.

The image forming apparatus 1 according to this embodiment can form, on the paper sheet S, an image that may act on the visual organs of pest insects to attract the pest insects and a drug region that may act on the olfactory organs of pest insects to attract the pest insects. Therefore, the paper sheet S set on the floor surface or the wall surface may act on, for example, the visual organs of pest insects and the olfactory organs of pest insects to attract, for example, many types of pest insects. The pest insects attracted to the drug region are killed by, for example, the insecticide component contained in the drug.

The paper sheet S having the image and the drug region formed thereon may be set on the floor surface or the wall surface after, for example, being folded to have a cylindrical or polygonal shape. The paper sheet S of the cylindrical shape may, for example, accommodate the killed pest insects therein, which makes it easy to discard the killed pest insects. The image data may include information on, for example, a folding line acting as a guide to fold the paper sheet S. As a result, the folding line along which the paper sheet S may be folded into a cylindrical shape is formed on the paper sheet S.

Figure 2:
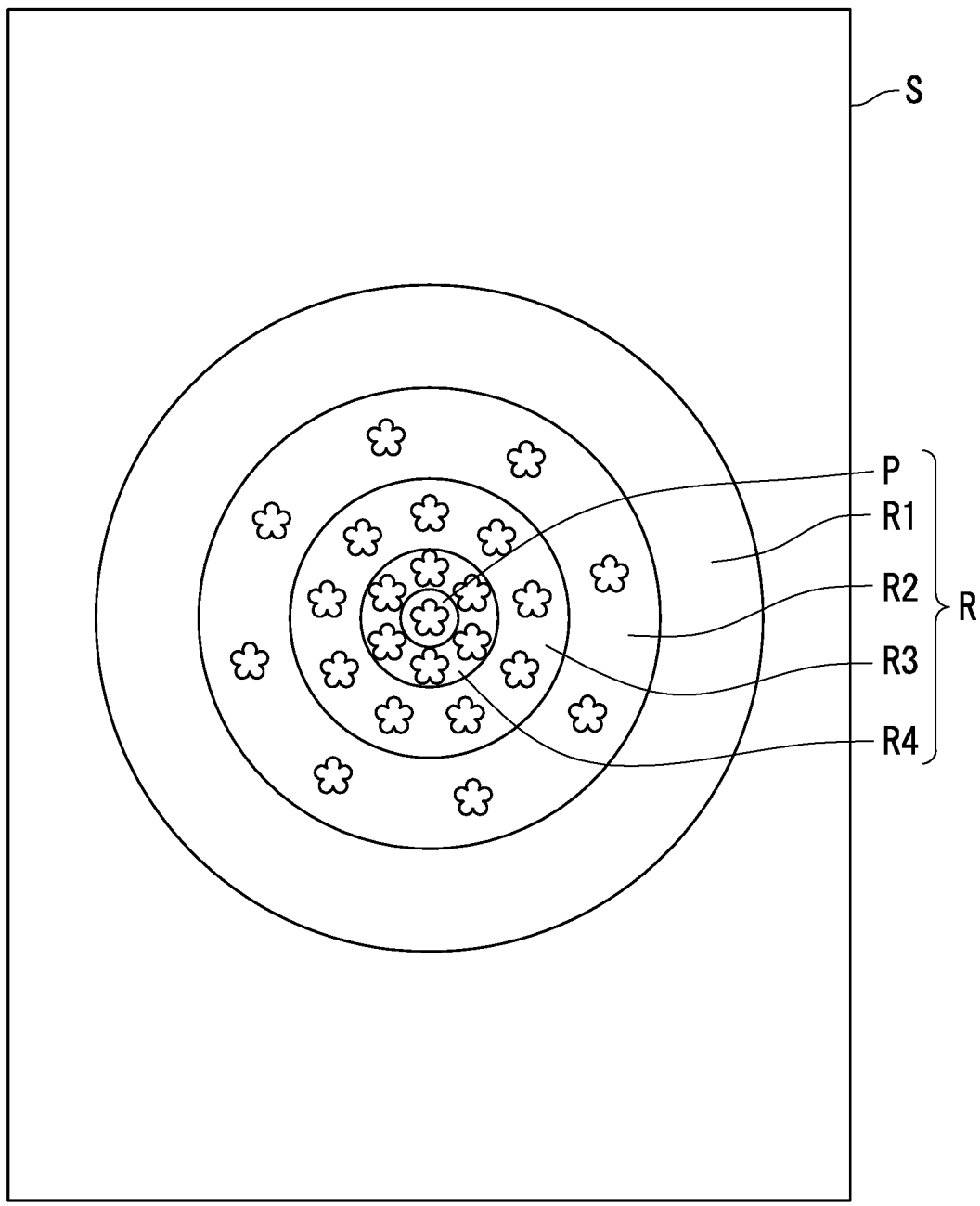
FIG. 2 illustrates an example of a paper sheet having an image and a drug region formed thereon by the image forming apparatus according to the first embodiment of the present invention.
Figure 3:
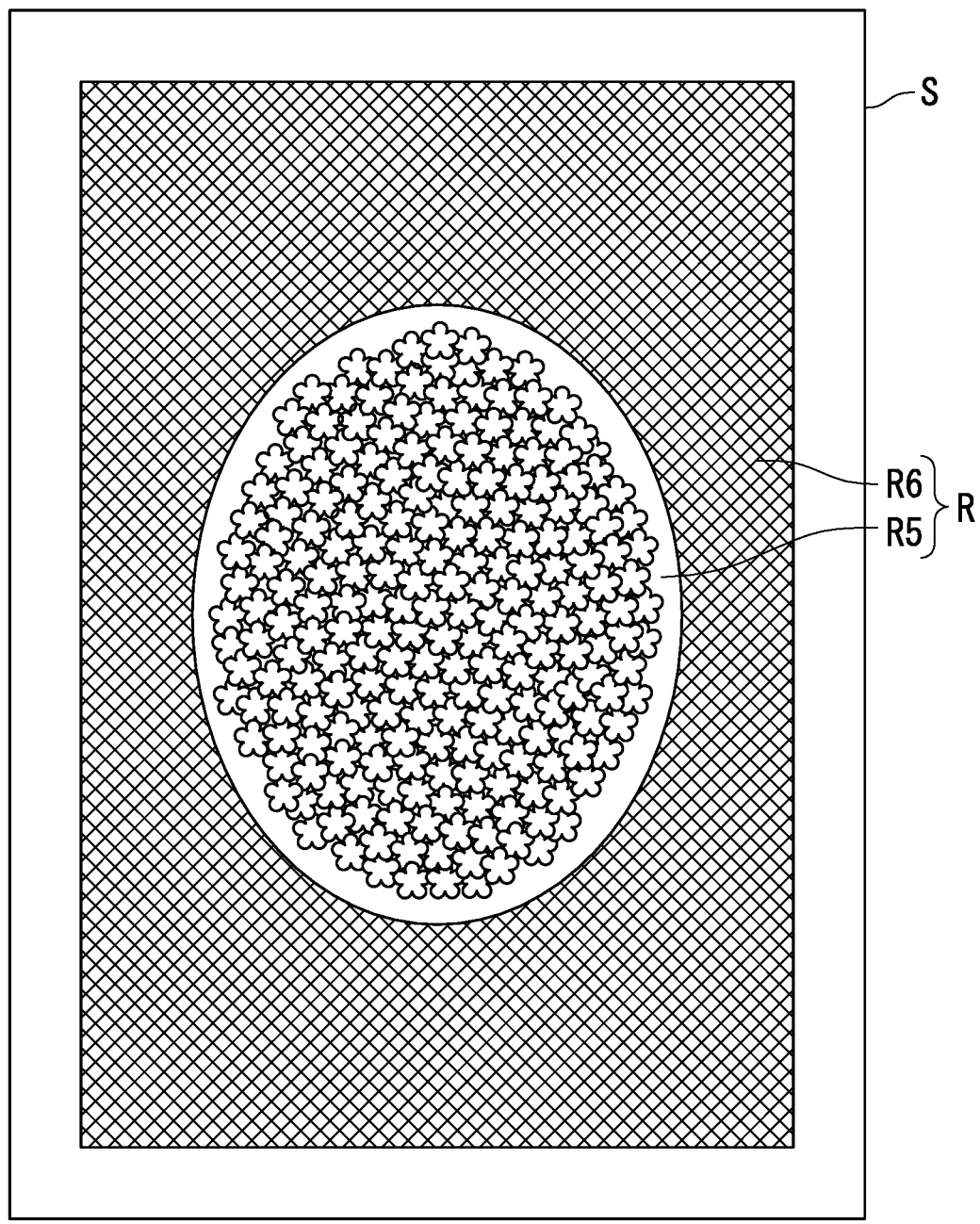
FIG. 3 illustrates an example of a paper sheet having an image and a drug region formed thereon by the image forming apparatus according to the first embodiment of the present invention.

Now, with reference to FIGS. 1 to 3, the drug spray process will be further described. FIG. 2 and FIG. 3 each illustrate an example of the paper sheet S having an image and a drug region formed thereon by the image forming apparatus 1 according to this embodiment. The image illustrated in each of FIG. 2 and FIG. 3 represents a plurality of petals. In the image illustrated in FIG. 2, the distance between adjacent petals among the plurality of petals becomes shorter as the petals are closer to a center of the paper sheet S.

Referring to FIG. 2, in the case where the drug data includes position data representing an attraction point P, the controller 9 controls the spray section 10 to form a drug region R in which the concentration of the drug is increased from an edge of the drug region R toward the attraction point P based on the drug data. In the drug region R, the concentration of the drug is highest at the attraction point P. As a result, in the state where the paper sheet S is set on the floor surface or the wall surface, pest insects can be attracted to the attraction point P.

The position of the attraction point P is set at a predetermined position in the paper sheet S. The position of the attraction point P is set by, for example, a user so as to correspond to the image to be formed on the paper sheet S. At the attraction point P, for example, pest insect killing means such as a predetermined insecticide, a predetermined insect trap may be located. In this case, pest insects attracted to the attraction point P can be killed effectively.

The controller 9 may control the spray section 10 to form a drug region R including the attraction point P and a plurality of drug sites R1, R2, R3, and R4. The concentrations of the drug in the plurality of drug sites R1, R2, R3, and R4 are increased by degrees from the edge of the drug region R toward the attraction point P. As a result, the concentration of the drug in the drug region R is increased stepwise from the edge of the drug region R toward the attraction point P. Attraction of pest insects to the attraction point P can be achieved more effectively.

In the image illustrated in FIG. 3, the plurality of petals are concentrated at a center of the paper sheet S. In the image illustrated in FIG. 3, the plurality of petals are higher in brightness and warmer in hue than the background.

As illustrated in FIG. 3, in the case where, for example, the image data does not include the position data, the controller 9 controls the spray section 10 to form a drug region R including a drug site R5 and a drug site R6 corresponding to the brightness of the image and the hue of the image. The drug site R5 is an example of first drug site according to the present invention, and the drug site R6 is an example of second drug site according to the present invention.

Based on the image data, the controller 9 specifies, from the image, a region where the brightness is higher than a predetermined brightness and a region where the hue is warmer than a predetermined hue. The controller 9 controls the spray section 10 to form the drug site R5 in such a specified region and to form the drug site R6 in a region excluding the specified region. The concentration of the drug in the drug site R5 is higher than the concentration of the drug in the drug site R6. In general, pest insects tend to like a bright site. Therefore, the drug site R5, which has a high brightness or a warm hue, and has a high concentration of the drug, can attract the pest insects effectively. By contrast, the drug site R6 formed in a region having a low brightness or a cool hue has a low concentration of the drug. As a result, in this embodiment, the amount of the drug to be sprayed toward the drug site R6 can be reduced. Therefore, the amount of the drug to be sprayed toward the paper sheet S can be reduced.

In the case where neither a region where the brightness is higher than a threshold value nor a region where the hue is warmer than a threshold value can be specified from the image, the controller 9 controls the spray section 10 such that a drug region R in which the concentration of the drug is uniform is formed to overlap the entirety of the image. In the case where neither a region where the brightness is higher than the threshold value nor a region where the hue is warmer than the threshold value can be specified, the controller 9 may notify the user that such regions cannot be specified.

In this embodiment, in the case where the drug data includes information that specifies a type of pest insects, the controller 9 may control the spray section 10 based on the information that specifies the type of pest insects. In this case, a drug region R in which the concentration of the drug corresponds to the specific type of pest insects is formed on the paper sheet S. The concentration of the drug, in the drug region R, corresponding to the specific type of pest insects is, for example, stored on the memory in the controller 9 in advance. The information that specifies the type of pest insect is, for example, information that specifies either one of pest insects such as fly, mosquito, and cockroach. The information that specifies the type of pest insects is set by, for example, the user.

In the case where the drug data includes the information that specifies the type of pest insects, the controller 9 may control the spray section 10 to spray a specific drug corresponding to the specific type of pest insects based on the information that specifies the type of pest insects and thus to form a drug region R. In this case, a paper sheet S that is capable of killing only such a type of specific pest insects can be formed. In the case where the spray section 10 does not contain such a specific drug, the controller 9 notifies the user that the spray section 10 does not contain the specific drug. After notifying the user that the spray section 10 does not contain the specific drug, the controller 9 may notify the user that the specific drug may be ordered from an external party via a line such as the Internet.

Figure 4:
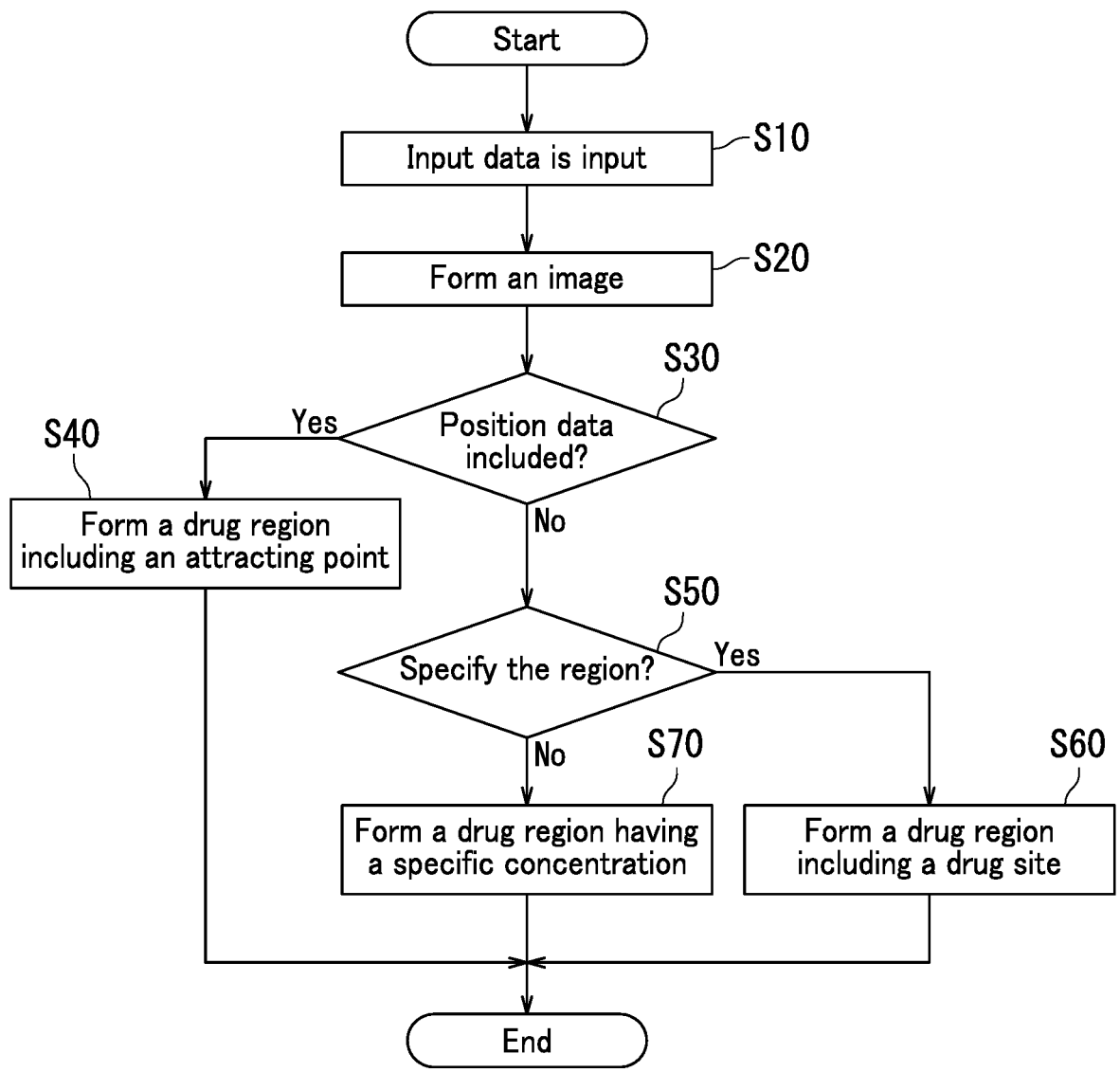
FIG. 4 is a flowchart illustrating an image forming process and a drug spray process performed by a controller according to the first embodiment of the present invention.

Now, with reference to FIG. 4, the image forming process and the drug spray process executed by the controller 9 will be further described. FIG. 4 is a flowchart illustrating the image forming process and the drug spray process executed by the controller 9.

As illustrated in FIG. 4, in Step S10, input data is input to the controller 9 from an input section. Then, in Step S20, the controller 9 controls the recording head section 4 to form an image on the paper sheet S based on the image data. After the image is formed on the paper sheet S, the controller 9 determines in Step S30 whether or not the drug data includes position data on the attraction point P. In the case where the drug data includes the position data (Yes in Step S30), the controller 9 controls the spray section 10 to form a drug region R including the attraction point P on the paper sheet S based on the drug data in Step S40. Then, the controller 9 finishes the drug spray process. As a result, as described above with reference to FIG. 2, the drug region R including the attraction point P and the image are formed on the paper sheet S.

In the case where the drug data does not include the position data (No in Step S30), the controller 9 specifies, from the image, a region where the brightness is higher than a threshold value and a region where the hue is warmer than a threshold value in Step S50. In the case where the regions were specified from the image (Yes in Step S50), the controller 9 controls the spray section 10 to form a drug region R including the drug site R5 and the drug site R6 based on the drug data in Step S60. Then, the controller 9 finishes the drug spray process. As a result, as described above with reference to FIG. 3, the drug region R including the drug site R5 and the drug site R6 and the image are formed on the paper sheet S.

In the case where the regions cannot be specified (No in Step S50), the controller 9 controls the spray section 10 such that a drug region R having a single concentration of the drug is formed to overlap the image based on the drug data in Step S70. Then, the controller 9 finishes the drug spray process. As a result, the image and the drug region R are formed on the paper sheet S.

In the case where in Step S10, the drug data of the input data includes information that specifies a type of pest insects, the controller 9 may control the spray section 10 to spray a specific drug to form a drug region R having a concentration of the drug stored on the memory in advance, and finish the drug spray process. In this case, the image and the drug region R that is effective for the specific type of pest insects are formed on the paper sheet S.

Second Embodiment

Figure 5:
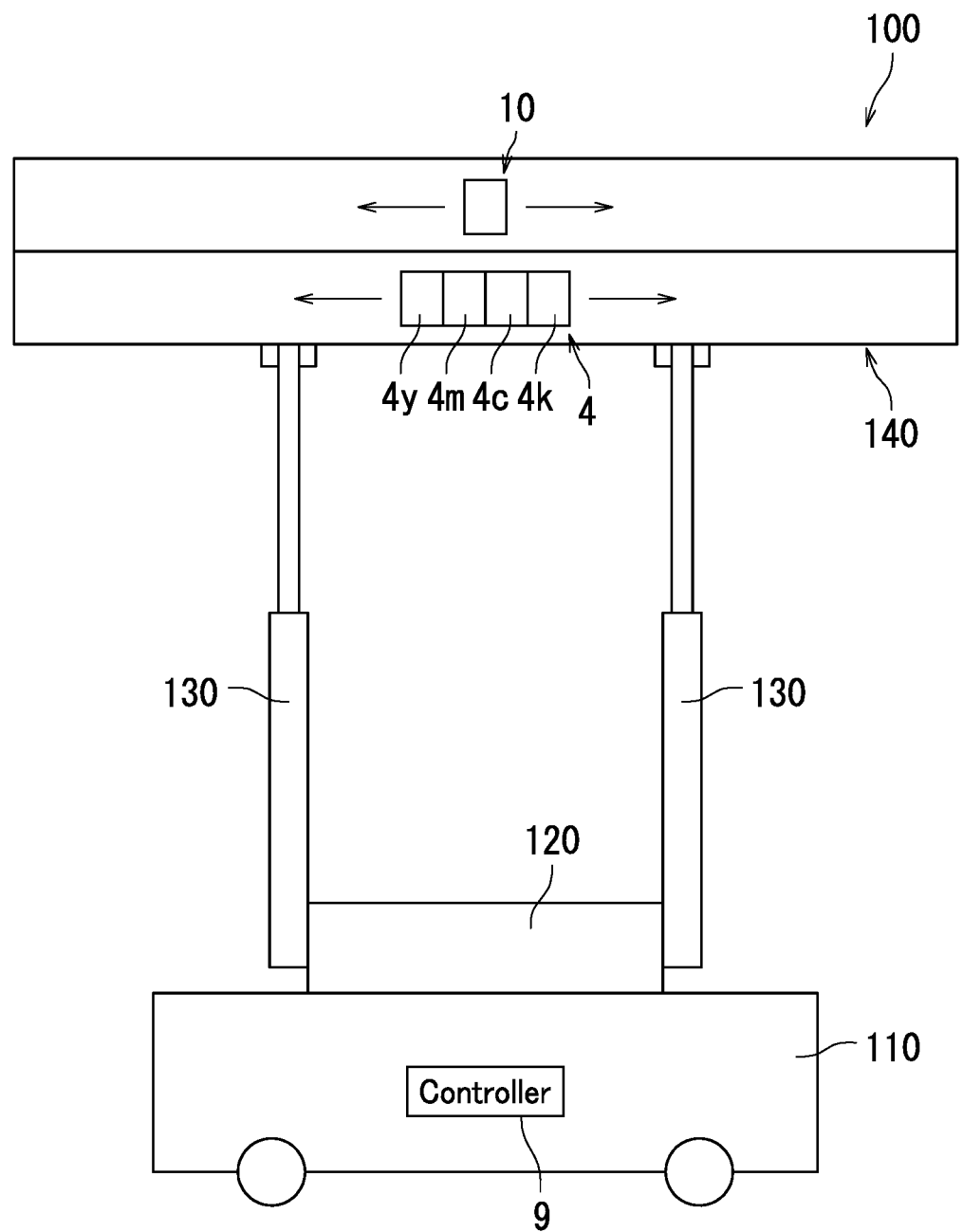
FIG. 5 illustrates a structure of an image forming apparatus according to a second embodiment of the present invention.

Now, with reference to FIG. 5, an image forming apparatus 100 according to a second embodiment of the present invention will be described. FIG. 5 illustrates the image forming apparatus 100 according to the second embodiment of the present invention. As illustrated in FIG. 5, the image forming apparatus 100 according to the second embodiment of the present invention is movable and is capable of forming an image and a drug region R on a floor surface and a wall surface, unlike the image forming apparatus 1 according to the first embodiment of the present invention. The image forming apparatus 100 forms an image with ink and a drug region with a drug on the floor surface and the wall surface. The floor surface and the wall surface are each an example of a recording medium according to the present invention. The wall surface may be a paper sheet S set on the floor surface, and the wall surface may be a paper sheet S set on the wall surface.

The image forming apparatus 100 includes a self-propelled cart 110, a base section 120, a pair of arm sections 130, a casing section 140, the recording head section 4, the spray section 10, and the controller 9. The self-propelled cart 110, the base section 120, and the pair of arm sections 130 are included in a support section according to the present invention. The controller 9 is accommodated in, for example, the self-propelled cart 110.

The self-propelled cart 110 includes wheels in contact with the floor surface, a cart main body supported by the wheels, and a wheel driving source accommodated in the cart main body. The controller 9 controls the driving source such that the self-propelled cart 110 runs along a predetermined path. The self-propelled cart 110 may be operated by, for example, a user.

The base section 120 is supported by a top surface of the cart main body of the self-propelled cart 110. The base section 120 is rotatable about a vertical axis. The arm sections 130 are supported on side surfaces of the base section 120 so as to be opposite to each other. The base section 120 supports the pair of arm sections 130 such that the arm sections 130 are swingable about a horizontal axis. The pair of arm sections 130 are extendable in a longitudinal direction. The arm sections 130 each include, for example, a cylinder and a piston.

Tips of the pair of arm sections 130 support the casing section 140 such that the casing section 140 is swingable. The casing section 140 accommodates the recording head section 4 and the spray section 10. The casing section 140 is lengthy. One of ends in the longitudinal direction of the casing section 140 is supported by one of the arm sections 130, and the other end in the longitudinal direction of the casing section 140 is supported by the other arm section 130.

The recording head section 4 and the spray section 10 are located side by side in a width direction of the casing section 140. The recording head section 4 and the spray section 10 are movable in the longitudinal direction of the casing section 140. The spray section 10 and the recording heads 4y, 4m, 4c, and 4k are each, for example, a serial head.

Now, an image forming process of forming an image on the floor surface with ink and a drug spray process of forming a drug region on the floor surface with a drug will be described. The controller 9 controls the self-propelled cart 110 to move to a predetermined position on the floor surface based on the input data. The predetermined position is a position at which the recording head section 4 may form an image at a designated position based on the input data.

The controller 9 controls the base section 120 and the arm sections 130 such that the casing section 140 contacts the floor surface after the self-propelled cart 110 stops running. It is desired that the arm sections 130 are, for example, fully extended. In this case, the recording head section 4 are moved to a position where formation of the image is to be started, and the spray section 10 is moved to a position where formation of the drug region is to be started.

After the recording head section 4 and the spray section 10 are moved to the above-described start positions, the controller 9 executes the image forming process such that the image is formed on the floor surface with ink based on the image data. The controller 9 executes the image forming process and also executes the drug spray process of spraying the drug to form the drug region on the floor surface based on the drug data. As a result, the image and the drug region are formed on the floor surface.

The controller 9 may increase sizes of the image and the drug region by, for example, extending or shortening the arm sections 130. The controller 9 may further increase the sizes of the image and the drug region by allowing the self-propelled cart 110 to run.

The image forming apparatus 100 according to this embodiment may control the base section 120 and the arm sections 130 such that the casing section 140 contacts the wall surface after the self-propelled cart 110 moves to a predetermined position. In this manner, the image and the drug region can be formed also on the wall surface as well as the floor surface. The image forming apparatus 100 according to this embodiment may form the image and the drug region also on a paper sheet set on the floor surface or the wall surface in advance.

So far, the image forming apparatus 1 according to the first embodiment and the image forming apparatus 100 according to the second embodiment of the present invention have been described with reference to FIGS. 1 to 5. However, the present invention is not limited to the first embodiment or the second embodiment, and may be carried out in any of various forms without departing from the gist of the present invention.

For example, in the embodiment of the present invention, the drug is applied repeatedly by the spray section 10 to adjust the concentration of the drug in the drug region. The present invention is not limited to this. The spray section 10 merely needs to be capable of adjusting the concentration of the drug in the drug region to be formed on the paper sheet S.

In another embodiment, the spray section 10 further includes a concentration adjusting section. The concentration adjusting section adjusts the concentration of the drug supplied from a predetermined drug tank and supplies the post-adjustment drug to the spray head 12. In more detail, the concentration adjusting section, for example, adds a predetermined diluent to the drug to adjust, more specifically, decrease the concentration of the drug. The concentration adjusting section may add, for example, an attractant or an insecticide component to the drug to adjust, more specifically, increase the concentration of the drug. In this case, the drug having the adjusted concentration is sprayed from the spray section 10 toward the paper sheet S based on the drug data. This allows the concentration of the drug in the drug region to be adjusted to a desired level.

The drawings mainly illustrate the elements schematically for easier understanding. The thickness, length, and the like of each of the elements illustrated in the drawings may be different from the actual thickness, length, and the like for the reason related to the drafting of the drawings. The shape or the like of each of the elements described in the embodiments is merely an example and is not limiting, and may be modified in any of various manners without substantially departing from the effect of the present invention.

INDUSTRIAL APPLICABILITY

The present invention is applicable to an image forming apparatus that forms an image and a drug region on a recording medium.

The invention claimed is:

1. An image forming apparatus comprising:
   an image forming section configured to form an image on a recording medium;
   a spray section configured to spray a drug toward the recording medium to form a drug region on the recording medium; and
   a controller configured to control the spray section, wherein
   the controller controls the spray section such that at least a part of the image formed on the recording medium and at least a part of the drug region overlap each other,
   the drug region includes an attraction point attracting a pest insect, and
   the controller controls the spray section such that the drug has a concentration that is increased from an edge of the drug region toward the attraction point.

2. The image forming apparatus according to claim 1, wherein:
   the controller specifies, from the image, at least one of a region having a brightness higher than a predetermined brightness and a region having a hue warmer than a predetermined hue,
   the controller controls the spray section to form a first drug site on the specified region and to form a second drug site on a region excluding the specified region, and
   the second drug site has a concentration of the drug that is lower than the concentration of drug of the first drug site.

3. The image forming apparatus according to claim 1, further comprising
   a conveyance section configured to convey the recording medium, wherein
   the image forming section forms the image on the recording medium that is being conveyed by the conveyance section, and
   the spray section forms the drug region on the recording medium that is being conveyed by the conveyance section.

4. The image forming apparatus according to claim 1, further comprising
   a drying device configured to dry the image formed on the recording medium.

5. The image forming apparatus according to claim 4, wherein
   the controller controls the spray section to spray the drug toward the recording medium after the drying device dries the image.

6. The image forming apparatus according to claim 1, further comprising:
   a casing section configured to accommodate the image forming section and the spray section; and a support section configured to support the casing section such that the casing section is allowed to approach, or to be distanced from, the floor surface as the recording medium or the wall surface as the recording medium.

7. An image forming apparatus comprising:

an image forming section configured to form an image on a recording medium;

a spray section configured to spray a drug toward the recording medium to form a drug region on the recording medium; and a controller configured to control the spray section, wherein the controller controls the spray section such that at least a part of the image formed on the recording medium and at least a part of the drug region overlap each other, the controller specifies, from the image, at least one of a region having a brightness higher than a predetermined brightness and a region having a hue warmer than a predetermined hue, the controller controls the spray section to form a first drug site on the specified region and to form a second drug site on a region excluding the specified region, and the second drug site has a concentration of the drug that is lower than the concentration of drug of the first drug site.

8. An image forming apparatus comprising:

an image forming section configured to form an image on a recording medium;

a spray section configured to spray a drug toward the recording medium to form a drug region on the recording medium; and a controller configured to control the spray section, wherein the controller controls the spray section such that at least a part of the image formed on the recording medium and at least a part of the drug region overlap each other, and the image forming apparatus further comprises a drying device configured to dry the image formed on the recording medium.

* * * * *